(12) United States Patent
O'Brien et al.

(10) Patent No.: US 7,990,964 B2
(45) Date of Patent: Aug. 2, 2011

(54) SYSTEM FOR MESSAGE DELIVERY TO FIELD PERSONNEL

(75) Inventors: David O'Brien, Carlsbad, CA (US);
Vikram Yashpal, Carlsbad, CA (US);
Greg Nissley, Lititz, PA (US)

(73) Assignee: QUALCOMM Incorporated, San Diego, CA (US)

( * ) Notice: Subject to any disclaimer, the term of this patent is extended or adjusted under 35 U.S.C. 154(b) by 1017 days.

(21) Appl. No.: 10/997,137

(22) Filed: Nov. 24, 2004

(65) Prior Publication Data

US 2006/0120343 A1 Jun. 8, 2006

(51) Int. Cl.
*H04L 12/28* (2006.01)

(52) U.S. Cl. ...................................... 370/392; 370/395.3

(58) Field of Classification Search ................... 370/312, 370/349, 351, 392–393, 395.3; 709/203, 709/238
See application file for complete search history.

(56) References Cited

U.S. PATENT DOCUMENTS

| | | | |
|---|---|---|---|
| 5,594,872 A * | 1/1997 | Kawano et al. | 709/240 |
| 6,335,963 B1 | 1/2002 | Bosco | |
| 6,363,412 B1 * | 3/2002 | Niwa et al. | 709/203 |
| 6,463,462 B1 * | 10/2002 | Smith et al. | 709/206 |
| 6,970,719 B1 | 11/2005 | McConnell et al. | |
| 7,409,428 B1 | 8/2008 | Brabec et al. | |
| 7,412,487 B2 * | 8/2008 | Caughey | 709/206 |
| 7,765,297 B2 * | 7/2010 | Wolfe et al. | 709/225 |
| 2002/0051222 A1 * | 5/2002 | Nishimura | 358/402 |
| 2002/0177437 A1 * | 11/2002 | Chesavage et al. | 455/426 |
| 2003/0083913 A1 | 5/2003 | Wolfe et al. | 705/7 |
| 2003/0093554 A1 * | 5/2003 | Wolfe et al. | 709/238 |
| 2003/0157968 A1 * | 8/2003 | Boman et al. | 455/563 |
| 2003/0174815 A1 * | 9/2003 | Didcock et al. | 379/88.13 |
| 2003/0179863 A1 * | 9/2003 | Wescott | 379/88.16 |
| 2004/0185832 A1 * | 9/2004 | Prenzel et al. | 455/412.1 |
| 2005/0009541 A1 * | 1/2005 | Ye et al. | 455/466 |
| 2005/0013419 A1 * | 1/2005 | Pelaez et al. | 379/88.14 |
| 2005/0020250 A1 * | 1/2005 | Chaddha et al. | 455/414.1 |
| 2005/0020288 A1 * | 1/2005 | Davis et al. | 455/466 |
| 2005/0021339 A1 * | 1/2005 | Ruetschi | 704/269 |
| 2005/0250475 A1 * | 11/2005 | Slemmer et al. | 455/412.1 |
| 2006/0031523 A1 * | 2/2006 | Morris | 709/227 |
| 2006/0069664 A1 | 3/2006 | Ling et al. | |

(Continued)

FOREIGN PATENT DOCUMENTS

| | | |
|---|---|---|
| EP | 1408705 | 3/2003 |
| WO | 9965256 A2 | 12/1999 |

(Continued)

OTHER PUBLICATIONS

Qualcomm, "Driver Notification Service for Transportation," Feb. 2007, pp. 1-2, Qualcomm Wireless Business Solutions, San Diego, California, USA, XP002465186.

(Continued)

*Primary Examiner* — William Trost, IV
*Assistant Examiner* — Roberta A Shand
(74) *Attorney, Agent, or Firm* — Ashish L. Patel

(57) ABSTRACT

System for message delivery to field personnel. The system includes a method for operating a server in a message delivery system. The method includes receiving a message for transmission to a recipient, and determining a message characteristic associated with the message. The method also includes obtaining contact information associated with the recipient based on the message characteristic, and transmitting the message to the recipient using a communication method indicated by the contact information.

48 Claims, 6 Drawing Sheets

U.S. PATENT DOCUMENTS

| | | | |
|---|---|---|---|
| 2006/0089931 A1* | 4/2006 | Giacobbe et al. | 707/9 |
| 2006/0121986 A1* | 6/2006 | Pelkey et al. | 463/40 |
| 2006/0168010 A1* | 7/2006 | Vill et al. | 709/206 |
| 2007/0024440 A1 | 2/2007 | Moran et al. | |
| 2008/0016174 A1* | 1/2008 | Schiavone et al. | 709/207 |

FOREIGN PATENT DOCUMENTS

| | | |
|---|---|---|
| WO | 0177842 | 10/2001 |
| WO | 2006058116 A1 | 6/2006 |

OTHER PUBLICATIONS

International Search Report, PCT/US07/078192, International Search Authority, European Patent Office. Feb. 20, 2008.

Written Opinion, PCT/US07/078192, International Searching Authority, European Patent Office. Feb. 20, 2008.

International Search Report and Written Opinion—PCT/US2005/042533, International Search Authority—European Patent Office—Apr. 20, 2006.

Office Action dated Dec. 31, 2008. U.S. Appl. No. 11/520,206.

Office Action dated Jun. 22, 2009. U.S. Appl. No. 11/520,206.

Advisory Action dated Sep. 9, 2009. U.S. Appl. No. 11/520,206.

Office Action dated Nov. 13, 2009. U.S. Appl. No. 11/520,206.

Office Action dated May 14, 2010. U.S. Appl. No. 11/520,206.

Advisory Action dated Aug. 9, 2010. U.S. Appl. No. 11/520,206.

* cited by examiner

| Macro# | Message |
|---|---|
| 1 | Vehicle Status |
| 2 | Time Information |
| 3 | Pick-up |
| 4 | Delivery |
| 5 | Routing |
| | |

| Vehicle Identifier | | Truck #21 | |
|---|---|---|---|
| Operator | | Smith, Robert | |
| Macro# | Type | Contact Information | Time Window |
| 5 | Mobile | 123 - 444 - 5555 | 8am-5pm |
| | Pager | 123 - 444 - 2345 | 8am-5pm |
| | Email | RobertSmith@email.com | Any |
| 4 | Mobile | 123 - 444 - 5555 | 8am-5pm |
| | Pager | 123 - 444 - 2345 | Any |
| 3 | Mobile | 123 - 444 - 5555 | 8am-5pm |
| 2 | Pager | 123 - 444 - 2345 | Any |
| 1 | n/a | n/a | n/a |
| | | | |

FIG. 4

SYSTEM FOR MESSAGE DELIVERY TO FIELD PERSONNEL

BACKGROUND

I. Field

The present invention relates generally to messaging systems, and more particularly, to a system for message delivery to field personnel.

II. Description of the Related Art

Advances in technology have provided for increased automation in many industries. For example, in the shipping industry, technology has allowed for the automatic tracking of delivery vehicles as they carry and deliver cargo virtually around the clock. Delivery vehicles now carry and deliver cargo to all parts of the country. For example, in the trucking industry, cargo-carrying tractor-trailers may be driven hundreds or thousands of miles to reach a delivery site. In some cases, the delivery vehicle must make one or more intermediate stops before it reaches its final destination.

Delivery vehicles in the field may communicate with a central dispatch station to receive various types of information. For example, the information may comprise basic information, such as daily status information, or the information may comprise important information, such as critical pick-up, routing, or delivery information.

Typically, vehicles in the field communicate with a dispatch station using a wireless communication system, such as a satellite communication system. These systems allow dispatchers to send text messages to a vehicle display system so that basic and important information can be communicated to the vehicle operator. However, when a text message is received at the vehicle display system, the vehicle operator generally must stop the vehicle to read the message. Stopping the vehicle is recommended for safety reasons, so that the vehicle operator does not lose control of the vehicle while reading the incoming text message.

Unfortunately, having to pull off the road to read an incoming text message is inconvenient for the vehicle operator and may lead to delivery delays. For example, the driver may not want to pull over just to read basic information received from the dispatch center. On the other hand, the vehicle may be at a location where it is not possible to immediately pull over to read the message. In this case, the receipt of the information is delayed because the vehicle operator must wait until it is possible to stop the vehicle before reading the message. Another problem occurs if the operator is away from the vehicle and is unable to receive the message. For example, the operator may be away from the vehicle at an over-night stopping point and therefore unable to receive the incoming message. Thus, current systems have several drawbacks since the vehicle operator must stop to receive both basic and important messages, and must be physically at the vehicle to receive any message.

Therefore, what is needed is a message delivery system that provides fast and reliable delivery of messages to field personnel. The system should operate to allow administrators or field personnel to define how messages are transmitted so that these messages can be reliably received. The system should also operate to alert a vehicle operator to the arrival of an important message so that the vehicle operator can decide whether or not to stop the vehicle to receive the message, or to return to the vehicle if the operator happens to be away from the vehicle when the important message arrives.

SUMMARY

In one or more embodiments, a message delivery system comprising methods and apparatus is provided to deliver messages to field personnel. In one embodiment, the system operates to transmit a message via one or more communication methods. For example, the communication methods comprise transmitting messages via a satellite communication channel or one or more wireless terrestrial communication channels. The system maintains a contact database that associates message characteristics with communication methods that are associated with field personnel. For example, the message characteristics may be defined by message type, priority, content, destination, groupings, attachments, or any other characteristic. Using the contact database, the system operates to determine one or more communication methods with which to transmit messages to particular field personnel based on selected message characteristics. As a result, the system allows messages to be transmitted to field personnel using communication methods that greatly increase the probability of reception, and in a way that does not diverted the activities of the field personnel with less important messages.

In one embodiment, a method is provided for operating a server in a message delivery system. The method comprises receiving a message for transmission to a recipient, and determining a message characteristic associated with the message. The method also comprises obtaining contact information associated with the recipient based on the message characteristic, and transmitting the message to the recipient using a communication method indicated by the contact information.

In another embodiment, apparatus is provided for a message delivery system. The apparatus comprises receiving logic that operates to receive a message for transmission to a recipient, and processing logic that operates to determine a message characteristic associated with the message, and for determining a communication method based on the message characteristic. The apparatus also comprises transmitting logic that operates to transmit the message to the recipient using the communication method selected by the processing logic.

In another embodiment, apparatus is provided for a message delivery system. The apparatus comprises means for receiving a message for transmission to a recipient, and means for determining a message characteristic associated with the message. The apparatus also comprises means for obtaining contact information associated with the recipient based on the message characteristic, and means for transmitting the message to the recipient using a communication method indicated by the contact information.

In another embodiment, a signal-bearing medium is provided that tangibly embodies a program of machine-readable instructions executable by a digital processing apparatus to perform a method for providing a message delivery system. The method comprises operations of receiving a message for transmission to a recipient, and determining a message characteristic associated with the message. The method also comprises operations of obtaining contact information associated with the recipient based on the message characteristic, and transmitting the message to the recipient using a selected communication channel indicated by the contact information.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein:

FIG. 3 shows one embodiment of a macro database;

FIG. 4 shows one embodiment of a contact database;

DETAILED DESCRIPTION

The following detailed description describes a message delivery system for delivering messages to field personnel using one or more communication methods. For example, the system is suitable for use in the trucking industry to deliver messages to field personnel that operate cargo-carrying delivery vehicles. In one or more embodiments, the message delivery system operates to determine selected characteristics of a message, and transmit that message to field personnel using one or more pre-selected communication methods. Thus, the system may be set up to transmit messages to field personnel in a manner that increases the probability of reception, and in a way does not divert or interfere with the activities of the field personnel. It should be understood that the described message delivery system could be used to deliver messages using virtually any type of communication method, and that the messages may be delivered to any type of field personnel, including the operators of vehicles such as trucks, buses, trains, automobiles, and watercraft. Furthermore, the message delivery system described herein could be used in non-vehicle applications, such as delivering messages to individuals in a manner chosen by the individual.

As described herein, the term "communication method" refers to both a type of message and a means for transmitting the message. For example a message type refers to whether the message is a text message, a pre-formatted text message, a VoIP voice message, a voice message, a pager message, or other type of message. The means for transmitting messages comprises a satellite network, a wireless terrestrial network, the Internet, or other communication network. Some of these message types may be transmitted over more than one communication network.

Figure 1:
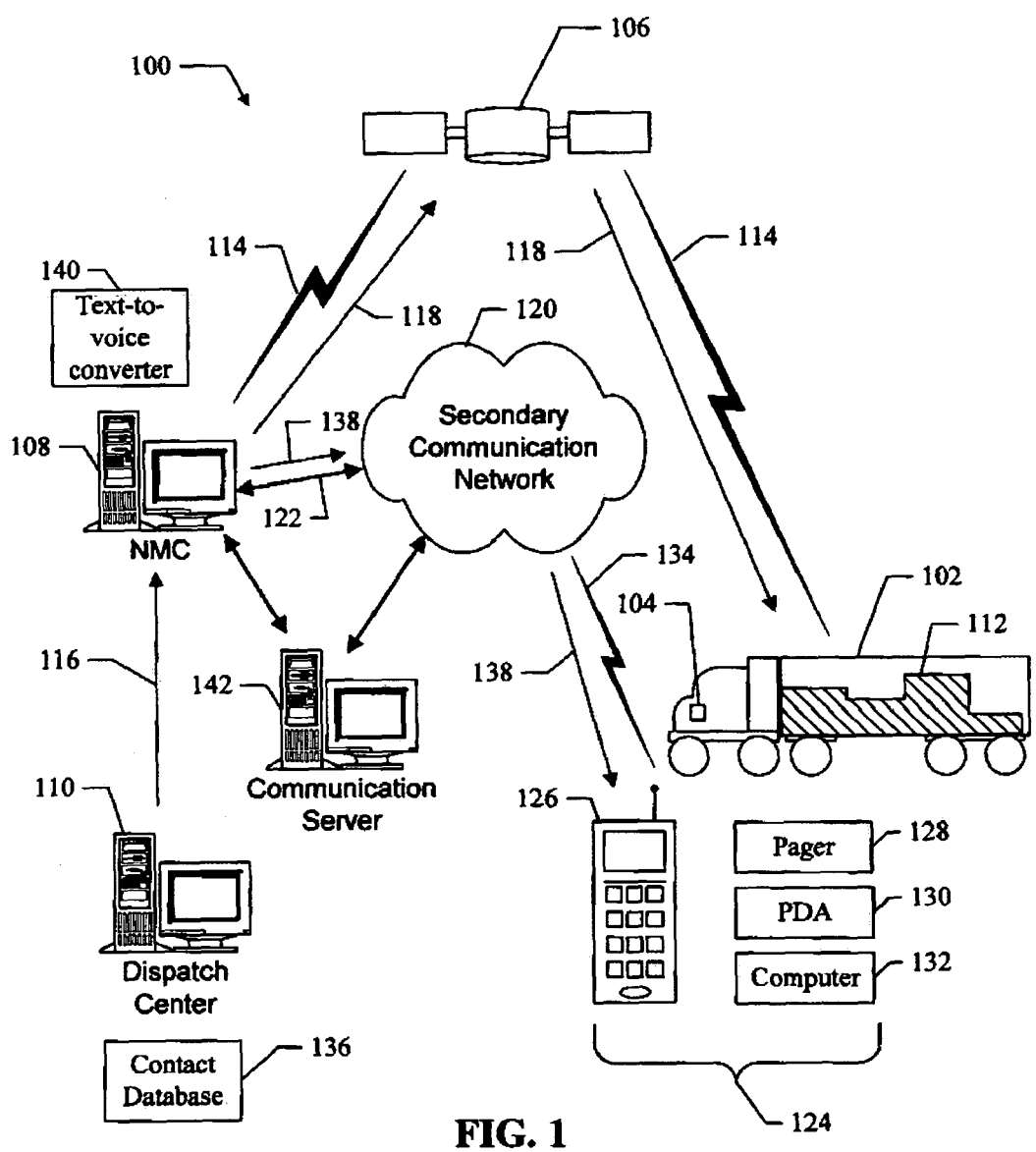
FIG. 1 shows one embodiment of a message delivery system.

FIG. 1 shows one embodiment of a message delivery system 100. For the purpose this description, the message delivery system 100 will be described with reference to delivering messages from a dispatch center 110 to an operator of a vehicle 102. The vehicle 102 in this embodiment comprises a tractor-trailer commonly used in the long-haul trucking industry to transport goods from shippers to consignees. The vehicle 102 includes a mobile communication terminal (MCT) 104 for communicating with the dispatch center using a primary communication method that, in this case, comprises transmitting and receiving text messages using a satellite-based communication system. Generally, the MCT 104 includes a text display system to receive and display text messages to the vehicle operator. The MCT 104 resides onboard a tractor portion of the vehicle 102 so as to be easily accessible by the vehicle operator. A trailer portion of the vehicle 102 includes cargo 112 to be delivery to one or more delivery sites.

In this embodiment, a primary communication method comprises a transmitting text messages over a satellite-based communication system widely used in the trucking industry. The satellite system provides communications between delivery vehicles and other parties, such as a fleet management center or dispatch center, family members, governmental authorities, consignees, shippers, and so on. For example, using the satellite communication system, the MCT 104 operates to receive text messages from the dispatch center 110 and display those messages to the vehicle operator using the text display system onboard the vehicle.

In one embodiment, a network management center (NMC) 108, otherwise known as a central station or hub, serves as a central communication point between MCT-equipped vehicles and their respective dispatch centers, other designated office(s), shippers, consignees, governmental authorities, family members, and so on. For example, the NMC 108 operates to pass communications between the dispatch center 110 and the vehicle 102 using the primary communication method that comprises the satellite 106 and communication links 114. In this embodiment, the vehicle dispatch center 110 generally monitors and controls a fleet of vehicles similar to vehicle 102. For example, a text message may be sent from the dispatch center 110 to the NMC 108, as shown at 116. The NMC 108 transmits the text message to the satellite 106 for delivery to the MCT 104 of the vehicle 102, as shown by 118. The vehicle operator may then read the text message to obtain the information sent from the dispatch center 110. It should be understood that in other embodiments, messages are transmitted directly from dispatch centers to their respective fleet of vehicles. In these embodiments, hub or NMC 108 is not used.

In one embodiment, the text messages are transmitted to a vehicle operator as is. In another embodiment, the text messages are condensed into pre-formatted messages, sometimes known as "macro" messages. Each pre-formatted message is identified by a code, such as a number, letter, or a combination thereof, and the pre-formatted messages are supplied to both an MCT 104 and a central station, such as NMC 108 or dispatch center 110, a priori. Messages between MCT 104 and the central station are then condensed by only transmitting relevant information to be inserted into blank information fields in the pre-formatted messages. The MCT 104 on the vehicle 102, as well as the central station, includes logic to encode/decode macro messages to display full text messages to the vehicle operator or central station operator, as the case may be.

In one embodiment, the message delivery system comprises a secondary communication network 120. The secondary communication network 120 operates to provide one or more additional communication methods, in addition to the primary communication method provided by, in this example, the satellite communication system. The secondary communication network 120 may comprise a terrestrial cellular telephone network, a CPDP data communication network, the Internet, a Wi-Fi communication network, a WiMax communication network, a paging network, among others, as well as a combination of two or more of the aforementioned communication networks. In one embodiment, the NMC 108 is coupled to the secondary communication network 120 via communication link 122, which may be any suitable type of communication link.

In one or more embodiments, the vehicle operator has access to one or more communication devices 124. The communication devices 124 may comprise a mobile telephone 126, a pager 128, a personnel digital assistant (PDA) 130, a mobile or stationary computer 132, or other communication device. The communication devices 124 may comprise virtually any type of communication device and are not limited to the devices shown in FIG. 1. The communication devices 124 have access to the secondary communication network 120 via communication link 134, which may comprise any suitable type of communication link. As a result, it is possible for the NMC 108 to use one or more of the communication methods available on the network 120 to send information to any of the communication devices 124, as shown by path 138. Thus, the primary communication method together with additional communication methods provided by the network 120 form a set of communication methods that may be used to transmit messages to field personnel redundantly, over using different communication methods. For example, one communication method may be sending a message as a text message over the satellite communication network, while a second communication method may comprise sending the same message redundantly as a voice message over a terrestrial communication network.

During operation of the message delivery system, messages to be transmitted to the vehicle 102 are assigned or otherwise include one or more message characteristics. For example, the message characteristics may comprise a priority indicator that is attached to the message, a message destination indicator that indicates a particular destination for the message, a macro indicator that indicates a particular type of message, a particular message attachment, a vehicle operator status, a time indicator that, for example, indicates a time the message was transmitted by dispatch center 110 or received by NMC 108, or otherwise composed, or any other type of message characteristic. Thus, the message characteristic may be virtually any characteristic that is contained in the message, attached to the message, or assigned to the message by NMC 108. For example, the messages may have an attached priority level indicator so that messages relating to pick-ups, routing, or deliveries can be assigned high priority levels, and messages relating to basic information can be assigned lower priority levels. A high priority message might be transmitted using both a primary and a secondary communication method while a lower priority message might only be transmitted using the primary, or default, communication method.

The message delivery system generally comprises a contact database 136 that contains information that associates message characteristics to one or more communication methods. For example, in one embodiment, the contact database associates message type, priority, content, destination, groupings, time indicator, or any other selected message characteristic(s) to one or more of the communication methods. Thus, using the contact database 136, it is possible to pre-define which of the communication methods will be used to transmit a message having selected message characteristics.

In one embodiment, the contact database 136 is located at the dispatch center 110, however, in other embodiments, the contact database 136 may be located at the NMC 108. In one embodiment, the dispatch center 110 uses the contact database 136 and selected message characteristics to associate contact information with messages to be transmitted. For example, in one embodiment, the contact database 136 allows contact information, such as a mobile telephone number, pager number, email address, or any other type of contact information to be associated with a message having a given message characteristic.

Information is entered into the contact database 136 generally by personal at dispatch center 110. The information may then be used at dispatch center 110 or it may be provided to NMC 108 for use at NMC 108. In another embodiment, information may be entered by an individual outside the dispatch center 110, such as by a vehicle operator using one of many possible devices, such as a wireless telephone, a wireless telephone having data capabilities, a desktop computer, a pager, or other wireless or wireline device. In this embodiment, a vehicle operator may access contact database 136, using conventional methods to authenticate him or herself to the database. Once authorized, the individual may enter new information or alter existing information contained in the contact database 136. For example, the individual may alter contact database 136 to specify that messages destined for his or her cellular telephone should instead be routed to a home email address. Or, he or she may alter the priority of messages so that only messages with a priority of his or her choosing will be routed to his or her cellular telephone, in addition to being routed through a satellite communication system for reception on an MCT.

The message and the contact information are sent to the NMC 108, which transmits the message to the vehicle 102 based on the contact information attached to the message. For example, the message may be transmitted to the vehicle 102 using a default communication method, such as the primary communication method, and/or one or more of the additional communication methods available over the secondary communication network 120. System administrators, field personnel, or other authorized persons may define information in the contact database 136 to determine which communication method(s) may be used to transmit a message having one or more message characteristics.

In one embodiment, a text-to-voice converter 140 is used to convert text messages to voice messages. After conversion, the voice messages may be transmitted over any of the available communication networks. For example, the voice message may be transmitted to the mobile telephone 126 over a terrestrial communication network, which allows the operator of the vehicle 102 to receive the message as a voice call on the mobile telephone 126. The voice call can be answered by the vehicle operator using a hands-free voice system aboard the vehicle 102, so that the operator may continue to operate the vehicle while receiving the voice message. In addition, the message may also be transmitted using the default communication method. It should be understood that in a text-to-voice conversion, the entire message may be converted, a portion, or a pre-defined voice message may be transmitted to the vehicle operator, such as "You have an important message waiting for you on the MCT".

In one or more embodiments, the message delivery system performs one or more of the following functions to efficiently deliver messages to field personnel.
1. Define one or more messages characteristic with which to determine a communication method.
2. Assemble a database of contact information that associates communication methods with the message characteristics.
3. For a message to be transmitted, determine contact information that describes one or more communication methods based on its message characteristic(s).
4. Transmit the message using one or more communication methods in a manner consistent with the contact information.

It should be noted that the operation of the message delivery system 100 may be allocated to any number of functional elements. For example, the functions of the NMC 108 may be divided between one or more other devices or network servers. For instance, voice processing, including the text-to-voice converter 140, may be allocated to a communication server 142 that has it own link with the secondary communication network 120. Thus, embodiments of the message delivery system may comprise any number of functional elements, devices, or servers arranged in any suitable configuration to perform the functions described herein.

Figure 2:
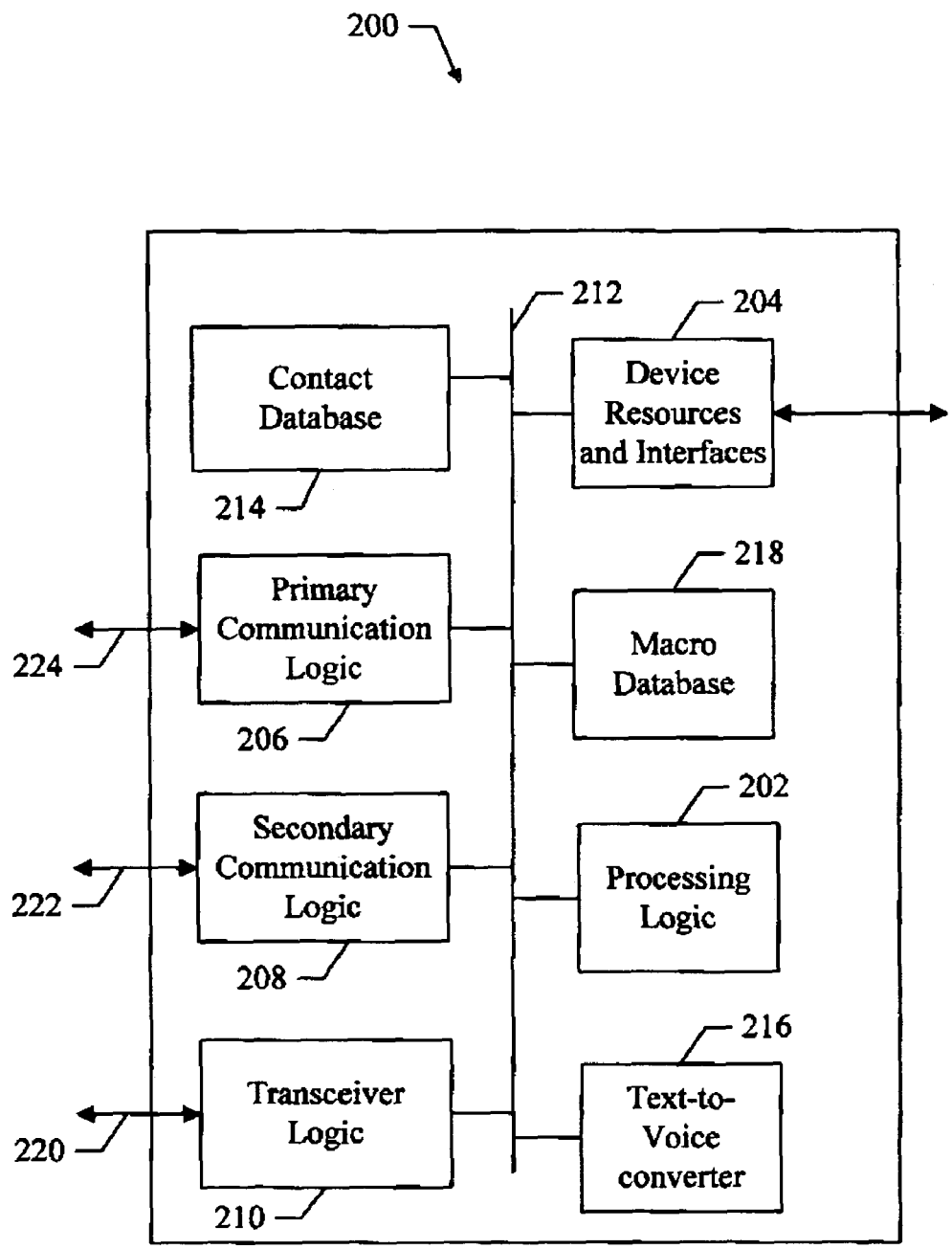
FIG. 2 shows one embodiment of a server for use in one or more embodiments of a message delivery system.

FIG. 2 shows one embodiment of a server 200 for use in one or more embodiments of the message delivery system.

The server 200 may be used at the NMC 108, or at another location, such as dispatch center 110. The server 200 comprises processing logic 202, device resources and interfaces 204, primary communication logic 206, secondary communication logic 208, and transceiver logic 210 all coupled to an internal data bus 212. The server 200 also comprises a contact database 214, text-to-voice converter 216, and a macro database 218, all of which are also coupled to the internal bus 212. It should be understood that the elements of the server 200 shown in FIG. 2 represent just one embodiment, and that implementation of the server 200 could be achieved in one of any number of ways using greater or fewer functional elements. For example, some or all of the function elements shown could be implemented in hardware and/or in a computer program executed by one or more processors.

In one embodiment, the processing logic 202 comprises a processor, CPU, gate array, logic, discreet circuitry, software, or any combination of hardware and software. Thus, the processing logic 202 generally comprises logic to execute machine-readable instructions to control one or more functional elements of the server 200 via the internal data bus 212.

The device resources and interfaces 204 comprise hardware and/or software that allow the server 200 to communicate with internal and external systems. For example, internal systems may include mass storage systems, memory, display driver, modem, or other internal device resources. The external systems may include user interface devices, printers, disk drives, or other local devices or systems.

The transceiver logic 210 comprises hardware and/or software that allow the server 200 to communicate with external systems. For example, in one embodiment, the transceiver logic 210 comprises a network link 220 that allows the server 200 to communicate with a remote dispatch center (i.e., the dispatch center 110), and/or any other type of remote server or device. Thus, the logic 210 generally comprises any suitable logic to allow the server 200 to communicate with external systems.

In one embodiment, a primary communication method utilizes the primary communication logic 206. The primary communication logic 206 comprises hardware and/or software that operate to allow the server 200 to transmit messages to in-route delivery vehicles using a primary communication channel 224. For example, in one embodiment, the primary communication channel 224 comprises a link to a satellite communication system. In another embodiment, the communication channel 224 may be the communication link 114 in FIG. 1.

In one embodiment, one or more secondary communication methods utilize the secondary communication logic 208. The secondary communication logic 208 comprises hardware and/or software that operate to allow the server 200 to transmit messages to field personnel using a secondary communication channel 222. For example, the secondary communication channel 222 may comprise a link to a terrestrial communication system.

The text-to-voice converter 216 comprises hardware and/or software to perform any suitable type of text-to-voice conversion. For example, a text message received at the server may be converted to a voice message by the text-to-voice converter 216. The voice message may then be transmitted to a vehicle operator using one or more of the available secondary communication methods.

The macro database 218 comprises any type of memory to store one or more macro messages that represent pre-formatted text messages. Each macro message includes a macro identifier to identify that particular message. In one or more embodiments, the macro identifier may be used as a message characteristic. As a result, the processing logic 202 can receive a macro message and process its macro identifier to determine which of the available communication method(s) to use to transmit the message.

The contact database 214 comprises any type of storage device to store contact information that relates message characteristics to one or more communication methods. For example, in one embodiment, the contact information contains message characteristics that are associated with the primary communication method and/or one or more of the secondary communication methods. In one embodiment, the information in the contact database is downloaded to the server 200 from a central dispatch center. For example, the dispatch center collects information about vehicle operators and assembles the contact database for download to the server 200.

During operation, the server 200 receives a message for transmission to a selected destination. For example, the message may be received from a dispatch center via the logic 210, and its destination may be an in-route delivery vehicle. The message includes one or more message characteristics that can be determined by the processing logic 202. The processing logic 202 uses the message characteristic(s) to determine which type of communication method(s) to use to send the message. In one embodiment, if the message does not include any message characteristics, for example, if a priority indicator is not attached to the message, the processing logic 202 transmits the message using a default communication method, such as sending the message as a macro message using a satellite communication channel provided by the primary communication logic 206.

Assuming a received message includes one or more predetermined message characteristics, the processing logic 202 uses the message characteristic(s) to determine one or more communication methods with which to transmit the message. For example, the processing logic 202 uses the information in the contact database 214 to determine the selected communication methods. The processing logic 202 then transmits the message using the determined communication methods. For example, if the contact information indicates that the message is to be transmitted via a pager network, the processing logic 202 controls the secondary communication logic 208 to transmit the message via a pager network. Similarly, if the contact information indicates that the message is to be transmitted via email, then the processing logic 202 controls the secondary communication logic 208 to transmit the message over the Internet or over a wireless terrestrial network. The message may, additionally, be transmitted over a default communication network. For example, if the default communication method uses a satellite communication system, then the processing logic 202 controls the primary communication logic 206 to transmit the message via a satellite communication system. Thus, the message may be transmitted using any or all of the available set of communication methods accessible to the server 200 depending on the message characteristic(s) and the contact database 214.

In one embodiment, if it is determined from the message characteristic(s) that the message is to be transmitted to a mobile telephone in the possession of a vehicle operator, the processing logic 202 controls the text-to-voice converter 216 to convert the text message to a voice message. The processing logic 202 then transmits the voice message over a secondary communication network to a telephone number provided by with the information in contact database 214. For example, the voice message may be transmitted over a wireless terrestrial communication network. Thus, the message is automatically routed to the mobile telephone of the vehicle operator. The message may, additionally, be transmitted over a default communication network.

In one embodiment, the server 200 operates as the result of the execution of instructions stored in a memory to perform the functions described herein. For example, the memory may be part of the processing logic 202. The instructions may be stored in the memory during manufacture of the server 200. In one embodiment, the instructions are embodied on a signal-bearing medium or computer-readable medium, such as a floppy disk, hard disk, CDROM, flash memory, or any other type of computer-readable media. The instructions on the computer-readable media may be retrieved and executed by the processing logic 202. In one embodiment, the instructions are downloaded from the computer-readable media into the server 200 and stored in the memory for later execution. Thus, in one embodiment, the server 200 operates to execute instructions stored on a signal-bearing medium or a computer-readable medium to perform the functions described herein.

It should be noted that the implementation of the server 200 is just one embodiment and that changes, additions, deletions, or modifications to the functional elements shown are within the scope of the described embodiments.

FIG. 3 shows one embodiment of a macro database 300. For example, in one embodiment, the macro database 300 may be the macro database 218 shown in FIG. 2. The macro database 300 shows macro identifiers 302 that correspond to macro messages 304. In one embodiment, the macro identifiers 302 are used by the message delivery system as the message characteristic. As a result, when the processing logic 202 receives a macro message from a dispatch center for transmission to a delivery vehicle, the processing logic 202 operates to use the macro identifier 302 associated with the message to determine one or more communication methods with which to transmit the message. For example, the processing logic 202 may use the macro identifier 302 to access the contact database 214 to determine which communication method(s) to use to transmit the message.

FIG. 4 shows one embodiment of the contact database 400. For example, in one embodiment, the contact database 400 may be the contact database 214 shown in FIG. 2. The contact database 400 relates message characteristics to contact information for field personnel. For the purpose of this description, the message characteristic comprises a macro identifier, however, any other type of message characteristic may be used.

In the example of FIG. 4, the contact database 400 comprises a vehicle identifier 402, operator identifier 404, and three columns that define a macro identifier 406, communication method type 408, and contact information 410. The contact database 400 also includes a time indicator 416. Thus, for a given destination vehicle, macro identifier, and time, the database 400 provides one or more communication methods that are to be used to transmit the message. For example, messages having a macro identifier of "5" will be transmitted via three communication methods during the hours of 8 a.m. to 5 p.m. The three methods comprise a transmitting the message via voice over a terrestrial communication network, sending the message in a pager format over a paging network, and sending the message in email format over the Internet, as shown at 412. It should be noted that in one or more embodiments, communication methods need not be identified in the contact database 400. For example, no communication methods are provided for a macro identifier of "1", which has a priority of "5", as shown at 414. In this case, the system may operate to transmit the message via the default communication method, which may be transmitting the message over a satellite communication network. In addition, the message delivery system may be configured to transmit any message received using a default communication method.

Figure 5:
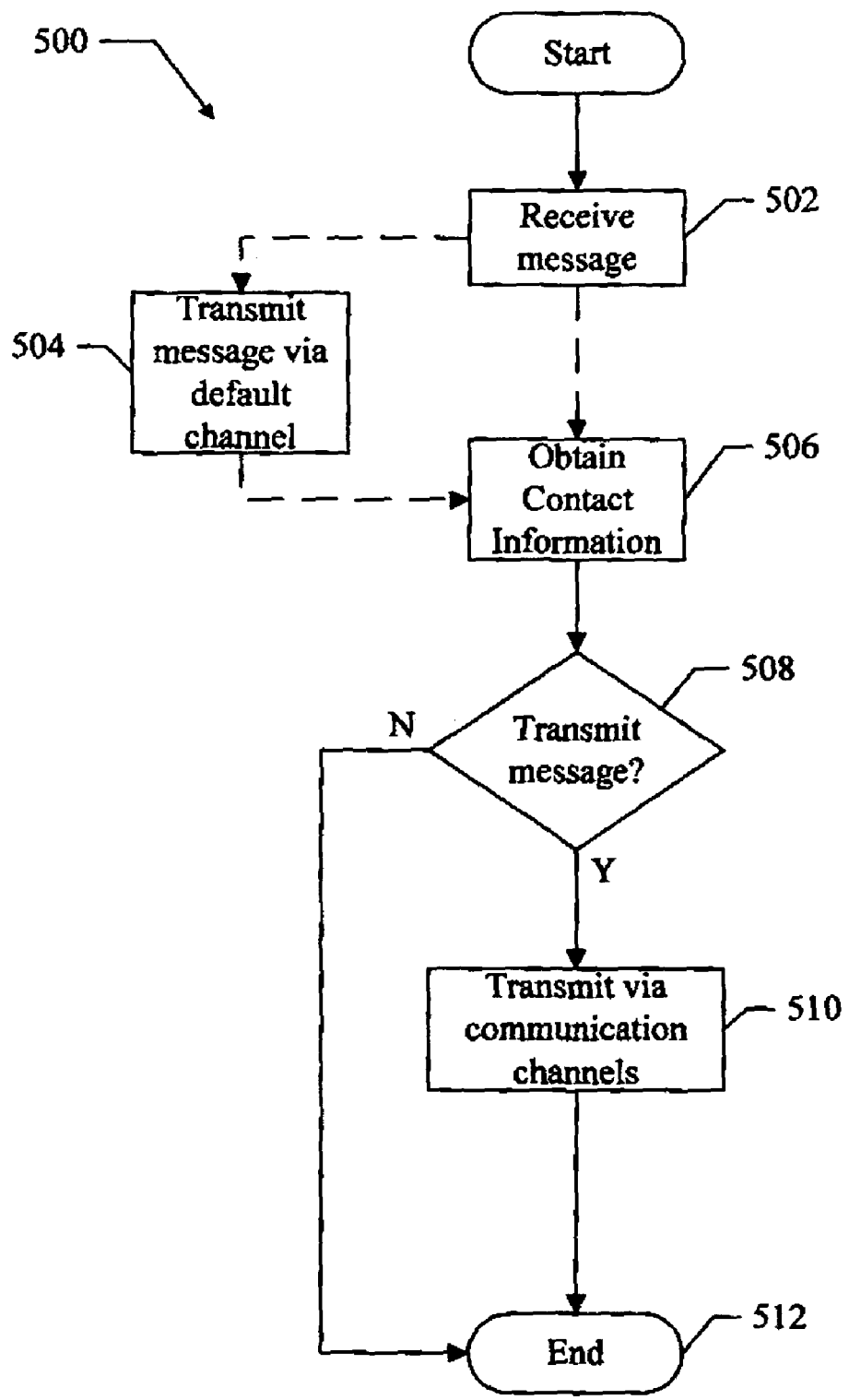
FIG. 5 shows one embodiment of a method for operating a server in one or more embodiments of a message delivery system.

FIG. 5 shows one embodiment of a method 500 for operating a server in one or more embodiments of a message delivery system. For example, the method 500 is suitable for use with one or more embodiments of the server 200 shown in FIG. 2. For the purpose of this description, the message delivery system will be described with reference to delivering messages from a dispatch center to an in-route delivery vehicle through NMC 108. Furthermore, the messages will include a message characteristic that comprises an attached priority level indicator. However, the method is equally applicable when using other types of message characteristics, such at macro identifiers.

At block 502, a message is received at the server for transmission to an in-route delivery vehicle. In one embodiment, the message includes a priority indicator that indicates a priority level for the message. For example, the priority level indicator may range from a value of one to a value of five, where one is the highest priority level. In one embodiment, the message is received by the transceiver logic 208 and sent to the processing logic 202 via the internal bus 210 for further processing.

At block 504, the message is transmitted to the in-route delivery vehicle using a default communication method. For example, the default communication method may be sending the message as a text message over a satellite communication system. However, it is possible to use any type of default communication channel. In another embodiment, the method proceeds to block 506 without performing the default transmission at block 504.

At block 506, contact information associated with the message characteristic is obtained. For example, for the purpose of this description, the message characteristic is a message priority level that is attached to the message. In one embodiment, the priority level indicator (or code) can be detected by the processing logic 202. The processing logic 202 uses the message characteristic to obtain the appropriate contact information from the contact database 214. For example, the message identifies a destination vehicle, driver, driver ID (such as social security number, driver's license number, etc), IP address, telephone number, MCT identification number, or other destination identifier, and the processing logic 202 uses the destination to search the contact database 214 to obtain contact information for the vehicle operator. The contact information identifies one or more communication methods that will be used to transmit the message. For example, the communication methods may include sending the message via a text message to a terrestrial or satellite communication system, a voice message to a terrestrial or satellite communication system, a text or voice message to an Internet address via a terrestrial or satellite communication system, an email message to an email address via a terrestrial or satellite communication system, or a combination of these. The contact information may also contain a time indicator that indicates when a particular type of communication method should be used to transmit the message.

At block 508, a test is performed to determine if the message needs to be transmitted via a default communication method in addition to a second method specified by the contact database. For example, the processing logic 202 may use information found in the contact database to determine if the message needs to be transmitted using a default communication method, such by sending the message as a text message over a satellite communication network. If a transmission is required, the method proceeds to block 510. If no transmission is required, the method proceeds to block 512.

At block 510, the message is transmitted via one or more communication methods as determined from the contact database 214. For example, the message may be transmitted as a voice message over a wireless terrestrial network. In one embodiment, the processing logic 202 controls the secondary communication logic 208 to transmit the message using the specified communication method. The method then ends at block 512.

It should be noted that the method 500 is just one embodiment and that it is possible to make minor changes, additions, deletions, combinations, or rearrangements of the method steps all within the scope of the described embodiments. Furthermore, although described with reference to a priority level indicator as the message characteristic, the method is suitable for use with virtually any type of message characteristic.

Figure 6:
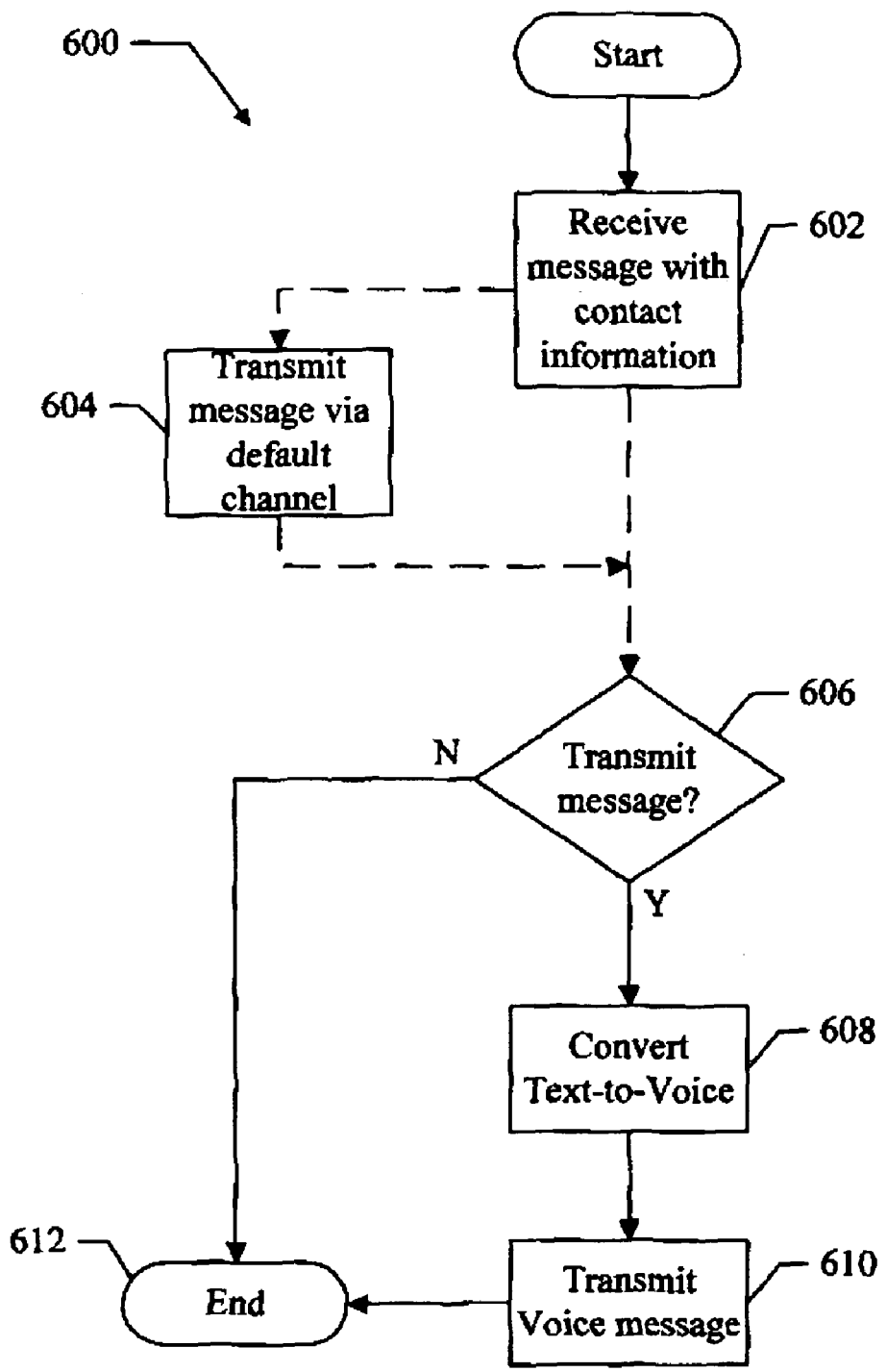
FIG. 6 shows another embodiment of a method for operating a server in one or more embodiments of a message delivery system.

FIG. 6 shows one embodiment of a method 600 for operating a server in one or more embodiments of a message delivery system. For example, the method 600 is suitable for use with one or more embodiments of the server 200 shown in FIG. 2. For the following description it will be assumed that the server 200 does not include the contact database 212, and that text messages received at the server include contact information. For example, in one embodiment, the contact database 212 may be located at the dispatch center and the contact information is attached to messages at a dispatch center before the messages are sent to the server. In another embodiment, the contact information is manually provided by a dispatch operator and placed or attached to the message.

At block 602, a message is received at the server for transmission to an in-route delivery vehicle. In one embodiment, the message is a macro message as described above. In another embodiment, the text message is not a macro message but a full text message. The message is received by the transceiver logic 208 and sent to the processing logic 202 via the internal bus 210 for further processing. The text message includes contact information that identifies one ore more communication methods that are to be used to transmit the message to the operator of the identified vehicle. For example, the contact information may include a mobile telephone number, pager number, email address, or any other type of contact information that may be used to transmit the message to the operator of the identified vehicle.

In one embodiment, the method proceeds to block 604 where the message is transmitted using a default communication method. For example, the default communication method may comprise sending the message as a text message over a satellite communication network. However, it is possible to use any type of default communication channel. In another embodiment, the method proceeds to block 606 without performing the default transmission at block 604.

At block 606, a test is performed to determine if the message needs to be transmitted using one or more selected communication methods. For example, the contact information attached to the message may indicate whether or not the message should be transmitted using one or more selected communication methods. For example, if no contact information is attached to the message, then no transmission is required and the method proceeds to block 612.

For the purpose of this description, it will be assumed that the contact information attached to the message indicates that the message is to be transmitted as a voice message over a wireless terrestrial communication network. For example, the contact information may include a mobile telephone number that can be used to transmit the message over the wireless terrestrial communication network. The processing logic 202 determines that the message needs to be converted to a voice message for transmission over the wireless terrestrial communication network to the identified mobile telephone.

At block 608, the message is converted to a voice message. For example, the text-to-voice converter 216 converts the message to a voice message using any suitable text-to-voice conversion logic and/or technique.

At block 610, the voice message is transmitted to the vehicle operator over the wireless terrestrial communication network, using, for example, the processing logic 202 for controlling the communication logic 208 to transmit the voice message. The method then ends at block 612.

It should be noted that the method 600 is just one embodiment and that it is possible to make minor changes, additions, deletions, combinations, or rearrangements of the method steps all within the scope of the described embodiments.

Figure 7:
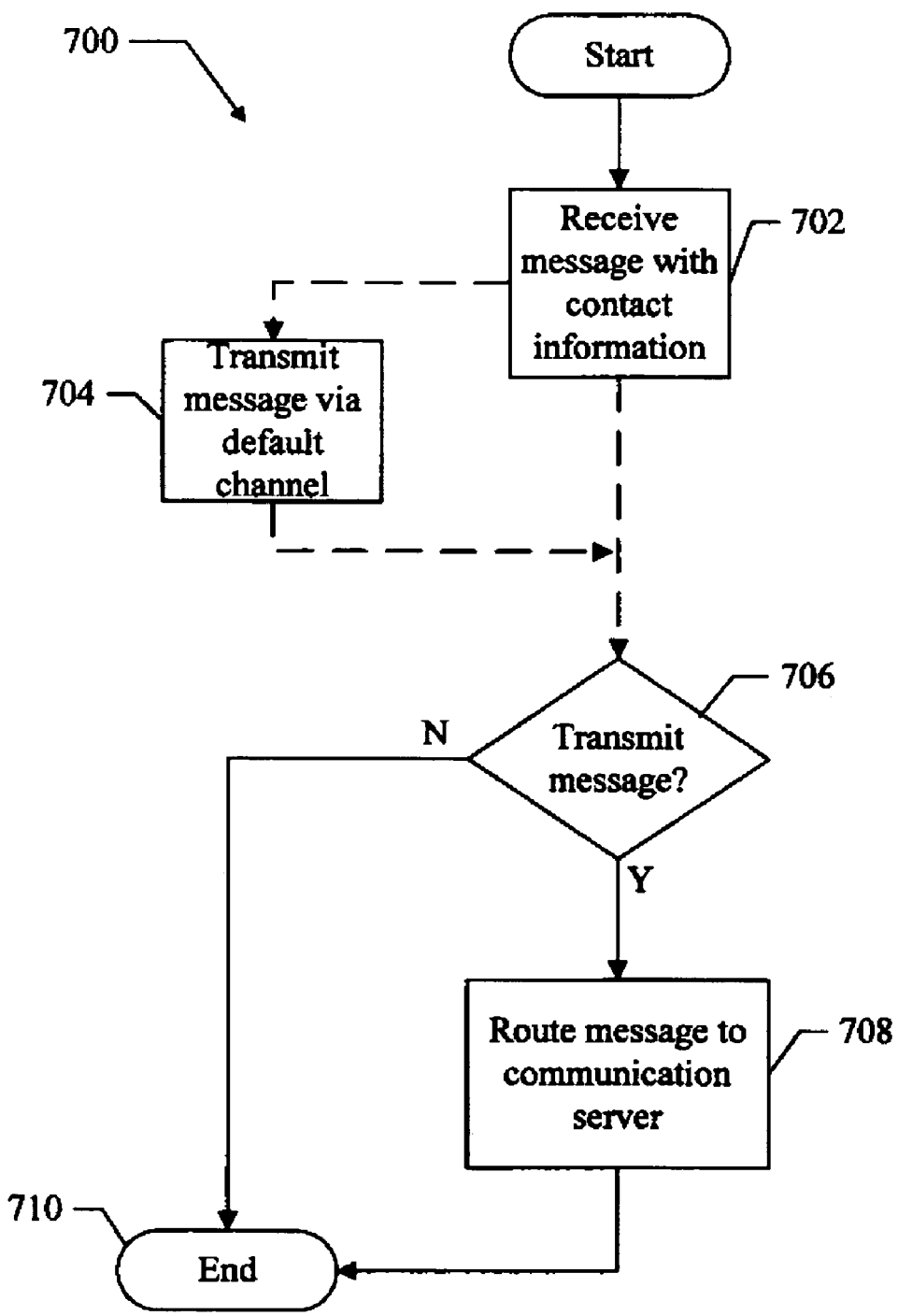
FIG. 7 shows another embodiment of a method for operating a server in one or more embodiments of a message delivery system.

FIG. 7 shows one embodiment of a method 700 for operating a server in one or more embodiments of a message delivery system. For example, the method 700 is suitable for use with one or more embodiments of the server 200 shown in FIG. 2. For the following description it will be assumed that a dispatch center attempts to send a message to an in-route vehicle using one embodiment of a message delivery system. The message includes attached contact information. It will also be assumed that the message delivery system includes a separate communication server that operates to transmit messages over a secondary communication network. For example, it will be assumed that the secondary communication logic 208 is located at the communication server, and that the server 200 communicates with the communication server via the transceiver logic 210.

At block 702, a message is received at the server for transmission to an in-route delivery vehicle. In one embodiment, the message comprises a macro message as described above. In another embodiment, the message is not a macro message but a full text message. The message includes contact information that identifies one or more communication methods that are to be used to transmit the message. In one embodiment, the contact information is attached to the message by the originator of the message, which may be a dispatch center. The message is received by the transceiver logic 210 and sent to the processing logic 202 for further processing.

In one embodiment, the method proceeds to block 704 where the message is transmitted using a default communication method. For example, the default communication method may comprise sending a text message over a satellite communication network. However, any type of default communication method may be used to transmit the message. In another embodiment, the method proceeds to block 706 without performing the default transmission at block 704.

At block 706, a test is performed to determine if the message needs to be transmitted via one or more selected communication methods other than the default communication method. For example, the contact information attached to the message indicates whether or not the message should be transmitted using one or more communication methods. If no contact information is attached to the message, then no secondary transmission is required and the method proceeds to block 710. For the purpose of this description, it will be assumed that the message is to be transmitted using one or more additional communication methods.

At block 708, the message is routed to a communication server so that the message can be transmitted using one or more additional communication methods. In one embodiment, the processing logic 202 forwards the message and the contact information to the communication server using the transceiver logic 210. The communication server operates to transmit the message using one or more communication methods as determined from the contact information. In one embodiment, the communication server comprises a text-to-voice converter that converts the test message to a voice message before transmission using a secondary communication network. The method then ends at block 710.

It should be noted that the method 700 is just one embodiment and that it is possible to make minor changes, additions, deletions, combinations, or rearrangements of the method steps all within the scope of the described embodiments. Furthermore, the methods 500, 600 and 700 describe various embodiments of a message delivery system, and it should be noted that the functions of these methods may be combined, rearranged, or reorganized within the scope of the described embodiments.

Thus, a message delivery system been described that operates to efficiently deliver messages to field personnel. Accordingly, while one or more embodiments have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The invention claimed is:

1. A method for operating a server in a message delivery system, the method comprising:
   determining a recipient identifier of a recipient and a predefined macro identifier from a macro message, wherein the macro identifier identifies a pre-formatted message;
   determining a communication method for transmitting a decoded message to the recipient based on the macro identifier, the recipient identifier, and a time indicator;
   obtaining contact information associated with the recipient based on the macro identifier, the recipient identifier, and the time indicator;
   decoding the macro identifier to insert the pre-formatted message in the decoded message; and
   transmitting the decoded message to the recipient using the contact information via the determined communication method.

2. The method of claim 1, further comprising transmitting the macro message to the recipient using a default communication method.

3. The method of claim 2, wherein the default communication method comprises sending the macro message as a text message over a satellite communication network.

4. The method of claim 1, wherein the step of obtaining contact information comprises obtaining the contact information directly from the macro message.

5. The method of claim 1, wherein the step of obtaining contact information comprising accessing a contact database.

6. The method of claim 1, wherein the step of determining a recipient identifier comprises determining the macro identifier from the content of the macro message.

7. The method of claim 1, wherein the step of determining a recipient identifier comprises determining the macro identifier from an attachment to the macro message.

8. The method of claim 1, further comprising:
   converting one of the macro message or the decoded message to a voice message; and
   transmitting the voice message to the recipient via the determined communication method.

9. The method of claim 1, wherein the step of transmitting the decoded message comprises transmitting the decoded message over one or more of a satellite network, a wireless terrestrial network, the Internet, or a paging network.

10. The method of claim 1, wherein the step of transmitting the decoded message comprises transmitting the decoded message to a communication server.

11. Apparatus for providing a message delivery service, the apparatus comprising:
    processing unit that operates to determine a recipient identifier of a recipient and a predefined macro identifier from a macro message, wherein the macro identifier identifies a pre-formatted message;
    determining logic that operates to determine a communication method based on the macro identifier, the recipient identifier, and a time indicator;
    decoding logic that operates to decode the macro identifier to insert the pre-formatted message in a decoded message; and
    network link that operates to transmit the decoded message to the recipient using the communication method determined by the determining logic.

12. The apparatus of claim 11 further comprising:
    a contact database that operates to provide contact information associated with the recipient based on the macro identifier and the recipient identifier;
    wherein one or more of the network link or processing unit operate to use the contact information to transmit the decoded message via the communication method.

13. The apparatus of claim 11, wherein the network link operates to transmit the macro message to the recipient using a default communication method.

14. The apparatus of claim 13, wherein the default communication method comprises sending the macro message as a text message over a satellite communication.

15. The apparatus of claim 11, wherein the processing unit operates to obtain the contact information associated with the recipient from an attachment to the macro message.

16. The apparatus of claim 11, wherein the processing unit operates to determine the macro identifier from the content of the macro message.

17. The apparatus of claim 11, wherein the processing unit operates to determine the macro identifier from an attachment to the macro message.

18. The apparatus of claim 11, further comprising a text-to-voice converter that operates to convert one of the macro message or the decoded message to a voice message that is transmitted to the recipient over a network specified by the communication method.

19. The apparatus of claim 11, wherein the network link operates to transmit the decoded message over a satellite network, a wireless terrestrial network, the Internet, or a paging network.

20. The apparatus of claim 11, wherein the network link operates to transmit the decoded message to a communication server.

21. Apparatus for providing a message delivery service, the apparatus comprising:
    means for determining a recipient identifier of a recipient and a predefined macro identifier from a macro message, wherein the macro identifier identifies a pre-formatted message;
    means for determining a communication method for transmitting a decoded message to the recipient based on the macro identifier, the recipient identifier, and a time indicator;
    means for obtaining contact information associated with the recipient based on the macro identifier, the recipient identifier, and the time indicator;

means for decoding the macro identifier to insert the pre-formatted message in the decoded message; and means for transmitting the decoded message to the recipient using the contact information via the determined communication method.

22. The apparatus of claim 21, further comprising means for transmitting the macro message to the recipient using a default communication method.

23. The apparatus of claim 22, wherein the default communication method comprises sending the macro message as a text message over a satellite communication network.

24. The apparatus of claim 21, wherein the means for obtaining contact information comprises means for obtaining the contact information directly from the macro message.

25. The apparatus of claim 21, wherein the means for obtaining contact information comprises means for accessing a contact database.

26. The apparatus of claim 21, wherein the means for determining a recipient identifier comprises means for determining the macro identifier from the content of the macro message.

27. The apparatus of claim 21, wherein the means for determining a recipient identifier comprises means for determining the macro identifier from an attachment to the macro message.

28. The apparatus of claim 21, further comprising:

means for converting one of the macro message or the decoded message to a voice message; and means for transmitting the voice message to the recipient via the determined communication method.

29. The apparatus of claim 21, wherein the means for transmitting the decoded message comprises means for transmitting the decoded message over one or more of a satellite network, a wireless terrestrial network, the Internet, or a paging network.

30. The apparatus of claim 21, wherein the means for transmitting the decoded message comprises means for transmitting the decoded message to a communication server.

31. A non-transitory computer-readable medium tangibly embodying a program of machine-readable instructions executable by a digital processing apparatus to perform a method for providing a message delivery system, said method comprising operations of:

determining a recipient identifier of a recipient and a pre-defined macro identifier from a macro message, wherein the macro identifier identifies a pre-formatted message;

determining a communication method for transmitting a decoded message to the recipient based on the macro identifier, the recipient identifier, and a time indicator;

obtaining contact information associated with the recipient based on the macro identifier, the recipient identifier, and the time indicator;

decoding the macro identifier to insert the pre-formatted message in the decoded message; and transmitting the decoded message to the recipient using the contact information via the determined communication method.

32. The non-transitory computer-readable medium of claim 31, further comprising transmitting the macro message to the recipient using a default communication method.

33. The non-transitory computer-readable medium of claim 32, wherein the default communication method comprises sending the macro message as a text message over a satellite communication network.

34. The non-transitory computer-readable medium of claim 31, wherein the operation of obtaining contact information comprises accessing a contact database.

35. The non-transitory computer-readable medium of claim 31, wherein determining a recipient identifier comprises determining the macro identifier from the content of the macro message.

36. The non-transitory computer-readable medium of claim 31, wherein determining a recipient identifier comprises determining the macro identifier from an attachment to the macro message.

37. The non-transitory computer-readable medium of claim 31, further comprising:

converting one of the macro message or the decoded message to a voice message; and transmitting the voice message to the recipient via the determined communication method.

38. The non-transitory computer-readable medium of claim 31, wherein transmitting the decoded message comprises transmitting the decoded message over one or more of a satellite network, a wireless terrestrial network, the Internet, or a paging network.

39. The non-transitory computer-readable medium of claim 31, wherein transmitting the decoded message comprises transmitting the decoded message to a communication server.

40. An apparatus for transmitting a message sent to a vehicle via a vehicle communication system and also to a communication device of an operator of the vehicle, the apparatus comprising:

a network management center for receiving the message, determining if the message does not include a communication address associated with the operator for a communication method, extracting a unique identifier from the message and retrieving the communication address based on the unique identifier only if the message is determined to not include the communication address, wherein the unique identifier uniquely identifies the vehicle in the vehicle communication system, and converting the message into a format for transmission via the communication method; and a network link for sending the converted message to the communication device of the operator via the communication method, wherein the communication device is associated with the communication address.

41. The apparatus of claim 40, wherein the communication address comprises a telephone number, a pager number, or an email address.

42. The apparatus of claim 40, wherein the network management center comprises a converter for converting the message into a customer selected text message.

43. The apparatus of claim 42, wherein the customer selected text message comprises a condensed macro message or a pre-formatted message associated with a macro code in the message.

44. The apparatus of claim 40, wherein the network management center comprises a converter for converting the message into a voice message.

45. The apparatus of claim 44, wherein the voice message comprises a predefined voice message or a pre-formatted message associated with a macro code in the message.

46. The apparatus of claim 40, wherein the network management center searches the message for the communication address associated with the operator for the communication method.

47. The apparatus of claim 46, wherein the network management center searches for the communication address associated with the operator for the communication method based on the unique identifier.

48. The apparatus of claim 40 wherein the network management center comprises a manager and editor for managing and editing a configuration associated with the operator.

* * * * *